US006284350B1

(12) United States Patent
Vermeulen et al.

(10) Patent No.: US 6,284,350 B1
(45) Date of Patent: Sep. 4, 2001

(54) OPTICAL CARD COMPRISING AN IMAGED LAYER

(75) Inventors: Leo Vermeulen, Herenthout; Michel Boulonne, Kappelle-op-den-Bos; Walther Wouters, Heist op den Berg; Diane Vertruyen, Zoersel, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/351,324

(22) Filed: Jul. 12, 1999

Related U.S. Application Data

(60) Provisional application No. 60/101,037, filed on Sep. 18, 1998.

(30) Foreign Application Priority Data

Jul. 31, 1998 (EP) ........................................ 98202578

(51) Int. Cl.[7] ........................................ B32B 3/00

(52) U.S. Cl. ........................ 428/195; 428/201; 428/207; 428/211; 428/913; 430/495.1; 430/945

(58) Field of Search ................................ 428/195, 199, 428/200, 201, 206, 207, 211, 402, 913; 430/495.1, 945

(56) References Cited

U.S. PATENT DOCUMENTS 5,474,873 * 12/1995 Akamatsu ........................... 430/273
5,494,885 * 2/1996 Kudo ................................... 503/227

OTHER PUBLICATIONS

Patent Abstracts of Japan, vol. 017, No. 114 (M–1377), Mar. 9, 1993 and JP 04 299195 A (Toppan Printing Co. Ltd.), Oct. 22, 1992.

Patent Abstracts of Japan, vol. 098, No. 008, Jun. 30, 1998 and JP 10 058728 A (Toppan Printing Co. Ltd.), Mar. 3, 1998.

Derwent Publication, Ltd. (London, GB), Section Ch., Week 9111, Class G06, AN 91–077592, XP002096602, Feb. 1, 1991, re JP 03 024538 A (Nitto Denko Corp.).

"NOVUS Technologies, Inc. Company and Product Summary", XP002098449, pp. 1–5.

Canon Europa: Security Applications, pp. 1–3, XP002098464.

* cited by examiner

*Primary Examiner*—Elizabeth Evans
(74) *Attorney, Agent, or Firm*—Breiner & Breiner, L.L.

(57) ABSTRACT

According to the present invention there is provided an imaged element comprising an optical card and underneath a layer package comprising in the order given an optional image receiving layer, a prelayer, an interlayer and a transparent support, at least the optional image receiving layer or the prelayer comprising an image, characterized in that the interlayer contains a polyurethane and a cross-linking agent.

6 Claims, No Drawings

OPTICAL CARD COMPRISING AN IMAGED LAYER

This application claims benefit of Provisional No. 60/101,037 filed Sep. 18, 1998.

FIELD OF THE INVENTION

The present invention relates to an optical card comprising an imaged layer.

More specifically the invention is related to an optical card comprising an imaged layer containing an identification mark of the bearer.

BACKGROUND OF THE INVENTION

In recent years, with the progress of information-oriented society, a large number of optical recording media and recording-reproducing device of information have been proposed which perform recording, reproduction of optical information such as optical disc, optical card, optical tape, etc. as the means for dealing with a diversity of information. In optical recording media, there has been known one in which the information formed into binary value can be detected by conversion into change in reflectance or change in intensity of the reflected light accompagnied with the surface shape such as presence of pit (concavity). Such optical recording medium is constituted of a preformat signal and a guide groove previously provided on a substrate according to the 2P method, compression molding, cast molding, etc, an amorphous thin film of a dye or pigment such as cyanine type or polymethine type, $TeO_x$, chalcogen, etc, coated of vapor deposited thereon as the optical recording layer capable of recording and reproduction with light, and further a protective substrate for protection of the above optical recording layer laminated thereon, if desired.

Among such optical recording media, an optical card has dimensions of, for example, 85,4 mm×54,0 mm×0.76 mm and is excellent in ortability. Said optical cards are intended for use in various applications such as divers type of identification operations. Therefore it is desirable that said cards contains a visual personified mark of the be arer of said card.

Said optical cards should have, when used for identification purpose, besides a number of security marks, also a visually discernible number of data and also bear a photograph of the owner.

OBJECTS OF THE INVENTION

It is an object of the present invention to provide a material having on an optical card a visual personified mark of the owner. It is a further object of the invention to provide a material having on an optical card a visual personified mark of the owner that is protected by a transparent support, preferably a subbed polyethylene terephthalate layer It is a further object of the invention to provide a material with a long lifespan having on an optical card a visual personified mark of the owner.

SUMMARY OF THE INVENTION

According to the present invention there is provided an imaged element comprising an optical card and underneath a layer package comprising in the order given an optional image receiving layer, a prelayer, an interlayer and a transparent support, at least the optional image receiving layer or the prelayer comprising an image, characterized in that the interlayer contains a polyurethane and a cross-linking agent.

DETAILED DESCRIPTION OF THE INVENTION

An optical card according to the invention comprises an optical recording medium, a support, preferably a non-transparent support and on the opposite of the support an adhesive layer, preferably a polyethylene layer, preferably with a thickness between 20 and 40 $\mu$m. Preferably said optical card contains a covering layer on the optical recording medium opposite the support.

According to one embodiment of the invention said optical card is laminated on the side containing the adhesive layer to a layer package comprising in the order given an image receiving layer, a prelayer, an interlayer, a transparent support, preferably a subbed biaxially oriented polyethylene terephthalate, a subbed biaxially oriented polyethylene naphthalate or a polycarbonate,layer and a protective layer.

In accordance with the invention a visual personification in the form of one or more images is formed by the diffusion transfer process (DTR-process) wherein the image-wise transfer of dye(s) or silver halogenide is controlled by the development of (a) photo-exposed silver halide emulsion layer(s), and wherein dye(s)or silver halogenide is (are) transferred imagewise in a special image receiving layer.

Dye diffusion transfer reversal processes are based on the image-wise transfer of diffusible dye molecules from an image-wise exposed silver halide emulsion material into a waterpermeable image-receiving layer containing a mordant for the dye(s). The image-wise diffusion of the dye(s) is controlled by the development of one or more image-wise exposed silver halide emulsion layers, that for the production of a multicolor image are differently spectrally sensitized and contain respectively a yellow, magenta and cyan dye molecules. A survey of dye diffusion transfer imaging processes has been given by Christian C. Van de Sande in Angew. Chem. - Ed. Engl. 22 (1983) n° 3, 191–209 and a particularly useful process is described in U.S. Pat. No. 4,496,645.

For use in dye diffusion transfer photography the type of mordant chosen will depend upon the dye to be mordanted. If acid dyes are to be mordanted, the image-receiving layer being a dye-mordanting layer contains basic polymeric mordants such as polymers of amino-guanidine derivatives of vinyl methyl ketone such as described in U.S. Pat. No. 2 882 156, and basic polymeric mordants and derivatives, e.g. poly-4-vinylpyridine, the metho-p-toluene sulphonate of poly-2-vinylpyridine and similar compounds described in U.S. Pat. No. 2 484 430, and the compounds described in DE-A- 2 009 498 and 2 200 063.

Other mordants are long-chain quaternary ammonium or phosphonium compounds or ternary sulphonium compounds, e.g. those described in U.S. Pat. No. 3,271,147 and 3,271,148, and cetyltrimethyl-ammonium bromide. Preferred are polyurethane and/or cationic polyurethane mordanting polymers. Certain metal salts and their hydroxides that form sparingly soluble compounds with the acid dyes may be used too. The dye mordants are dispersed or molecularly divided in one of the usual hydrophilic binders in the image-receiving layer, e.g. in gelatin, polyvinylpyrrolidone or partly or completely hydrolysed cellulose esters.

In U.S. Pat. No. 4,186,014 cationic polymeric mordants are described that are particularly suited for fixing anionic dyes, e.g. sulphinic acid salt dyes that are image-wise released by a redox-reaction described e.g. in EP-A- 004 399 and U.S. Pat. No. 4 232 107.

Said mordanting agents are present in the dye diffusion image receiving layer preferably in an amount ranging from 0.50 $g/m^2$ to 6.0 $g/m^2$.

Said dye diffusion image receiving layer preferably comprises a hydrophilic binder, more preferably a proteinous hydrophilic binder, most preferably gelatin in an amount ranging from 0.50 g/m$^2$ to 5.0 g/m$^2$ Preferably said dye diffusion image receiving layer contains at least one gelatin species whereof a 10% by weight aqueous solution at 36° C. and pH 6 has a viscosity higher than 35 mPa.s at a shearing rate of 1000s$^{-1}$.

A black-and-white photograph in the form of a silver image is formed by the silver salt diffusion transfer process, called herein DTR-process. According to said process dissolved silver halide salt is transferred imagewise in a special image receiving layer, called development nuclei containing layer, for reducing therein transferred silver salt. In said process, the prelayer is optional.

The principles of the DTR-process are described in U.S. Pat. No. 2,352,014 of Andre Rott, issued Jun. 20, 1944. According to said process silver complexes are image-wise transferred by diffusion from a silver halide emulsion layer to an image-receiving layer, where they are converted, in the presence of development nuclei, into a silver image. For this purpose, an image-wise exposed silver halide emulsion layer is developed by means of a developing substance in the presence of a so-called silver halide solvent. In the exposed parts of the silver halide emulsion layer the silver halide is developed to metallic silver so that it cannot dissolve anymore and consequently cannot diffuse. In the non-exposed parts of the silver halide emulsion layer the silver halide is converted into soluble silver complexes by means of a silver halide complexing agent, acting as silver halide solvent, and said complexes are transferred by diffusion into an image-receiving layer being in waterpermeable contact with said emulsion layer to form by the catalytic action of said development nuclei, in so-called physical development, a silver-containing image in the image-receiving layer.

The DTR-image can be formed in the image receiving layer of a sheet or web material which is a separate element with respect to the photographic silver halide emulsion material (a so-called two-sheet DTR element) or in the image receiving layer of a so-called single-support-element, also called mono-sheet element, which contains at least one photographic silver halide emulsion layer integral with an image receiving layer in waterpermeable relationship therewith. It is the first two-sheet version which is preferred for the preparation of the information carrier by the DTR method.

The DTR process can be utilized for reproducing line originals e.g. printed documents, as well as for reproducing continuous tone originals, e.g. portraits.

By the fact that the DTR-image is based on diffusion transfer of imaging ingredients the image-receiving layer and optionally present covering layer(s) have to be water-permeable.

A first method of reproducing images by the DTR process is by making a raster image using a screen and an emulsion with a steep gradient, which method is very well known to the people skilled in the art.

A second method is by making a continuous tone image. The reproduction of black-and-white continuous tone images by the DTR-process requires the use of a recording material capable of yielding images with considerable lower gradient than is normally applied in document reproduction to ensure the correct tone rendering of continuous tones of the original. In document reproduction silver halide emulsion materials are used which normally mainly contain silver chloride. Silver chloride not only leads to a more rapid development but also to high contrast.

In U.S. Pat. No. 3,985,561, to be read in conjunction herewith, a light-sensitive silver halide material is described wherein the silver halide is predominantly chloride and this material is capable of forming a continuous tone image on or in an image-receiving material by the diffusion transfer process.

According to said U.S. patent a continuous tone image is produced by the diffusion transfer process in or on an image-receiving layer through the use of a light-sensitive layer which contains a mixture of silver chloride and silver iodide and/or silver bromide dispersed in a hydrophilic colloid binder e.g. gelatin, wherein the silver chloride is present in an amount of at least 90 mole % based on the total mole of silver halide and wherein the weight ratio of hydrophilic colloid to silver halide, expressed as silver nitrate, is between 3:1 and about 10:1 by weight.

With these light-sensitive materials successful reproduction of continuous tone images can be obtained probably as a result of the presence of the indicated amounts of silver iodide and/or silver bromide and of the defined high ratio of hydrophillic colloid to silver halide.

According to U.S. Pat. No. 4,242,436 likewise to be read in conjunction herewith, the reproduction of continuous tone images can be improved by developing the photographic material with a mixture of developing agents comprising an o-dihydroxybenzene, e.g. catechol, a 3-pyrazolidone e.g. a 1-aryl-3-pyrazolidone and optionally a p-dihydroxybenzene, e.g. hydroquinone, the molar amount of the o-dihydroxybenzene in said mixture being larger than the molar amount of the 3-pyrazolidone, and the p-dihydroxybenzene if any being present in a molar ratio of at most 5% with respect to the o-dihydroxybenzene.

Suitable development nuclei for use in the above mentioned physical development in the image receiving layer are e.g. noble metal nuclei e.g. silver, palladium, gold, platinum, sulphides, selenides or tellurides of heavy metals such as Pd, Ag, Ni and Co.

Preferably used development nuclei are colloidal PdS, Ag2S or mixed silver-nickelsulphide particles. The amount of nuclei used in the image receiving layer is preferably between 0.02 mg/m$^2$ and 10 mg/m$^2$.

The image receiving layer comprises for best imaging results the physical development nuclei in the presence of a protective hydrophilic colloid, e.g. gelatin and/or colloidal silica, polyvinyl alcohol etc.

The transfer behaviour of the complexed silver largely depends on the thickness of the image-receiving layer and the kind of binding agent or mixture of binding agents used in the nuclei containing layer. In order to obtain a sharp image with high spectral density the reduction of the silver salts diffusing into the image receiving layer must take place rapidly before lateral diffusion becomes substantial. An image-receiving material satisfying said purpose is described in U.S. Pat. No. 4,859,566.

The coating of said layers proceeds preferably with slide hopper coater or curtain coater known to those skilled in the art.

The undercoat optionally incorporates substances that improve the image quality, e.g. incorporates a substance improving the image-tone or the whiteness of the image background. For example, the undercoat may contain silver complexing agent(s) and/or development inhibitor releasing compounds known for improving image sharpness.

In the image-receiving layer gelatin is used preferably as hydrophilic colloid. Gelatin is present preferably for at least 60% by weight and is optionally used in conjunction with an other hydrophilic colloid, e.g. polyvinyl alcohol, cellulose derivatives, preferably carboxymethyl cellulose, dextran, gallactomannans, alginic acid derivatives, e.g. alginic acid sodium salt and/or watersoluble polyacrylamides. Said other hydrophilic colloid may be used also in the top layer for at most 10% by weight and in the undercoat in an amount lower than the gelatin content.

The image-receiving layer and/or a hydrophilic colloid layer in water-permeable relationship therewith may comprise a silver halide developing agent and/or silver halide solvent, e.g. sodium thiosulphate in an amount of approximately 0.1 g to approximately 4 g per $m^2$.

The image-receiving layer or a hydrophilic colloid layer in water-permeable relationship therewith may comprise colloidal silica.

The image-receiving layer may comprise a silver halide developing agent and/or silver halide solvent, e.g. sodium thiosulphate in an amount of approximately 0.1 g to approximately 4 g per $m^2$.

The image-receiving layer may contain as physical development accelerators, in operative contact with the developing nuclei, thioether compounds such as those described e.g. in DE-A- 1 124 354; U.S. Pat. No. 4,013,471; U.S. Pat. No. 4,072,526 and in EP-A- 26 520.

According to a preferred embodiment the processing liquid and/or the DTR image-receiving material contains at least one image toning agent. In said case the image toning agent(s) may gradually transfer by diffusion from said image-receiving material into the processing liquid and keep therein the concentration of said agents almost steady. In practice such can be realized by using the silver image toning agents in a coverage in the range from 1 mg/$m^2$ to 20 mg/$m^2$ in a hydrophilic waterpermeable colloid layer.

A survey of suitable toning agents is given in the below mentioned book of Andre Rott and Edith Weyde, p. 61–65, preference being given to 1-phenyl-lH-tetrazole-5-thiol, also called 1-phenyl-5-mercapto-tetrazole, tautomeric structures and derivatives thereof such as 1-(2,3-dimethylphenyl)-5-mercapto-tetrazole, 1-(3,4-dimethylcyclohexyl)-5-mercapto-tetrazole, 1-(4-methylphenyl)-5-mercapto-tetrazole, 1-(3-chloro-4-methylphenyl)-5-mercapto-tetrazole, 1-(3,4-dichlorophenyl)-5-mercapto-tetrazole. Further particularly useful toning agents are of the class of thiohydantoins and of the class of phenyl substituted mercapto-triazoles. Still further toning agents suitable for use in accordance with the preferred embodiment of the present invention are the toning agents described in EP-A-218 752, 208 346, 218 753 and U.S. Pat. No. 4,683,189.

The above mentioned DTR image-receiving materials may be used in conjunction with any type of photosensitive material containing a silver halide emulsion layer. For continuous tone reproduction the silver halide comprises preferably a mixture of silver chloride, and silver iodide and/or silver bromide, at least 90 mole % based on the total mole of the silver halide being silver chloride, and the ratio by weight of hydrophillic colloid to silver halide expressed as silver nitrate is preferably between 3:1 and 10:1.

The binder for the silver halide emulsion layer and other optional layers contained on the imaging element is preferably gelatin. But instead of or together with gelatin, use can be made of one or more other natural and/or synthetic hydrophilic colloids, e.g. albumin, casein, zein, polyvinyl alcohol, alginic acids or salts thereof, cellulose derivatives such as carboxymethyl cellulose, modified gelatin, e.g. phthaloyl gelatin etc. The weight ratio in the silver halide emulsion layer of hydrophilic colloid binder to silver halide expressed as equivalent amount of silver nitrate to binder is e.g. in the range of 1:1 to 10:1, but preferably for continuous tone reproduction is between 3.5:1 and 6.7:1.

The silver halide emulsions may be coarse or fine grain and can be prepared by any of the well known procedures e.g. single jet emulsions, double jet emulsions such as Lippmann emulsions, ammoniacal emulsions, thiocyanate- or thioether-ripened emulsions such as those described in U.S. Pat. No. 2,222,264, 3,320,069, and 3,271,157. Surface image emulsions may be used or internal image emulsions may be used such as those described in U.S. Pat. No. 2,592,250, 3,206,313, and 3,447,927. If desired, mixtures of surface and internal image emulsions may be used as described in U.S. Pat. No. 2,996,382.

The silver halide particles of the photographic emulsions may have a regular crystalline form such as cubic or octahedral form or they may have a transition form. Regular-grain emulsions are described e.g. in J. Photogr. Sci., Vol. 12, No. 5, September/October 1964, pp. 242–251. The silver halide grains may also have an almost spherical form or they may have a tabular form, or may have composite crystal forms comprising a mixture of regular and irregular crystalline forms. The silver halide grains may have a multilayered structure having a core and shell of different halide composition. Besides having a differently composed core and shell the silver halide grains may comprise also different halide compositions and metal dopants inbetween.

The number average size expressed as the number average diameter of the silver halide grains may range from 0.2 to 1.2 μm, preferably between 0.2 mm and 0.8 mm, and most preferably between 0.3 mm and 0.6 mm. The size distribution can be homodisperse or heterodispere.

A homodisperse size distribution is obtained when 95% of the grains have a size that does not deviate more than 30% from the average grain size.

The emulsions can be chemically sensitized e.g. by adding sulphur-containing compounds during the chemical ripening stage e.g. allyl isothiocyanate, allyl thiourea, and sodium thiosulphate. Also reducing agents e.g. the tin compounds described in BE-A- 493 464 and 568 687, and polyamines such as diethylene triamine or derivatives of aminomethane-sulphonic acid can be used as chemical sensitizers. Other suitable chemical sensitizers are noble metals and noble metal compounds such as gold, platinum, palladium, iridium, ruthenium and rhodium. This method of chemical sensitization has been described in the article of R. KOSLOWSKY, Z. Wiss. Photogr. Photophys. Photochem. 46, 65–72 (1951).

The emulsions can also be sensitized with polyalkylene oxide derivatives, e.g. with polyethylene oxide having a molecular weight of 1000 to 20,000, or with condensation products of alkylene oxides and aliphatic alcohols, glycols, cyclic dehydration products of hexitols, alkyl-substituted phenols, aliphatic carboxylic acids, aliphatic amines, aliphatic diamines and amides. The condensation products have a molecular weight of at least 700, preferably of more than 1000. It is also possible to combine these sensitizers with each other as described in BE-P 537,278 and GB-P 727,982.

The silver halide emulsion may be sensitized panchromatically to ensure reproduction of all colors of the visible part of the spectrum or it may be orthochromatically sensitized.

The spectral photosensitivity of the silver halide can be adjusted by proper spectral sensitization by means of the usual mono- or polymethine dyes such as acidic or basic cyanines, hemicyanines, oxonols, hemioxonols, styryl dyes or others, also tri- or polynuclear methine dyes e.g. rhodacyanines or neocyanines. Such spectral sensitizers have been described by e.g. F. M. HAMER in "The Cyanine Dyes and Related Compounds" (1964) Interscience Publishers, John Wiley & Sons, New York.

The silver halide emulsions may contain the usual stabilizers e.g. azaindenes, preferably tetra- or penta-azaindenes, especially those substituted with hydroxy or amino groups. Compounds of this kind have been described by BIRR in Z. Wiss. Photogr. Photophys. Photochem. 47, 2–27 (1952). Other suitable stabilizers are i.a. heterocyclic mercapto compounds e.g. phenylmercaptotetrazole, quaternary benzothiazole derivatives, and benzotriazole.

A survey of photographic silver halide emulsions and their preparation is given in Research Disclosure December 1989, item 308119.

Processing of the image-wise exposed photographic silver halide emulsion layer proceeds whilst in contact with an image receiving material and is accomplished using an alkaline processing liquid having a pH preferably between 9 and 13. The pH of the alkaline processing liquid may be established using various alkaline substances. Suitable alkaline substances are inorganic alkali e.g. sodium hydroxide, potassium carbonate or alkanolamines or mixtures thereof. Preferably used alkanolamines are tertiary alkanolamines e.g. those described in EP-A- 397 925, EP-A- 397 926, EP-A- 397 927, EP-A- 398 435 and U.S. Pat. No. 4,632,896.

A combination of alkanolamines having both a pKa above or below 9 or a combination of alkanolamines whereof at least one has a pKa above 9 and another having a pKa of 9 or less may also be used as disclosed in the Japanese patent applications laid open to the public numbers 73949/61, 73953/61, 169841/61, 212670/60, 73950/61, 73952/61, 102644/61, 226647/63, 229453/63, U.S. Pat. No. 4,362,811, U.S. Pat. No. 4,568,634 etc. The concentration of these alkanolamines is preferably from 0.1 mol/l to 0.9 mol/l.

Suitable developing agents for the exposed silver halide are e.g. hydroquinone-type and 1-phenyl-3-pyrazolidone-type developing agents as well as p-monomethylaminophenol and derivatives thereof.

Preferably used is a combination of a hydroquinone-type and 1-phenyl-3-pyrazolidone-type developing agent wherein the latter is preferably incorporated in one of the layers comprised on the support of the photographic material. A preferred class of 1-phenyl-3-pyrazolidone-type developing agents is disclosed in EP-A- 449 340.

Other type of developing agents suitable for use in accordance with the present invention are reductones e.g. ascorbic acid derivatives. The developing agent or a mixture of developing agents can be present in an alkaline processing solution, in the photographic material or the image receiving material. In case the developing agent or a mixture of developing agents is contained in the photographic material and/or image receiving material, the processing solution can be merely an aqueous alkaline solution that initiates and activates the development.

In the DTR process the photographic element is developed in the presence of a silver halide solvent. Preferably used silver halide solvents are water soluble thiosulphate compounds such as ammonium and sodium thiosulphate, or ammonium and alkali metal thiocyanates. Other useful silver halide solvents (or "complexing agents") are described in the book "The Theory of the Photographic Process" edited by T. H. James, 4th edition, p. 474–475 (1977), in particular sulphites and uracil. Further interesting silver halide complexing agents are cyclic imides, preferably combined with alkanolamines, as described in U.S. Pat. No. 4,297,430 and U.S. Pat. No. 4,355,090. 2-mercaptobenzoic acid derivatives are described as silver halide solvents in U.S. Pat. No. 4,297,429, preferably combined with alkanolamines or with cyclic imides and alkanolamines. Dialkylmethylenedisulfones can also be used as silver halide solvent.

The silver halide solvent is preferably present in the processing solution but may also be present in one or more layers comprised on the support of the imaging element and/or receiving material.

The processing solution for use in the production of black-and-white photographs may comprise other additives such as e.g. thickeners, preservatives, detergents e.g. acetylenic detergents such as SURFYNOL 104™, SURFYNOL 465™, SURFYNOL 440™ etc. all available from Air Reduction Chemical Company, New York.

The DTR-process is normally carried out at a temperature in the range of 10C to 35° C.

More details on the DTR-process can be found in "Photographic Silver Halide Diffusion Processes" by A. Rott and E. Weyde, Focal Press, London, N.Y. (1972).

The prelayer according to the invention contains at least one gelatin species whereof a 10% by weight aqueous solution at 36° C. and pH 6 has a viscosity ranging from 15 to 30 mPa.s at a shearing rate of $1000s^{-1}$, preferably in an amount ranging from 0.20 g/m$^2$ to 2.0 g/m$^2$. Further said layer preferably contains a hardener, more preferably an epoxysiloxane. Other additives such as an UV-absorber and a surfactant may also be present.

The interlayer comprises a polyurethane polymer, preferably in the form of a dispersion, preferably with a viscosity at 23° C. between 20 and 80 mPa.s at a shearing rate of 250s and a cross-linking compound. The particles have preferably a number average diameter ranging from 0.05 to 1 $\mu$m. Said polyurethane has preferably a molecular weight between 5,000 and 1,000,000, more preferably between 20,000 and 100,000. Said polyurethane is present in a range from 1 g/m$^2$ to 10 g/m$^2$. Furtheron said layer contains a cross-linking compound, preferably in the range from 0.02 g/m$^2$ to 0.2 g/m$^2$. Preferred cross-linking compounds are isocyanates, preferably oligomeric isocyanates as DESMODUR DA™, a 1–6 hexamethylene diisocyanate polyisocyanate from Bayer, A. G., and amidosiloxanes.

The support is preferably between 50 and 150 Im thick, more preferably between 75 and 125 $\mu$m. Said support is transparent and preferably oriented.

Preferably the imaged element carries a protecting layer at the side of the support not covered by an imaged layer. The protecting layer comprises a polymer, preferably a poly (meth)acrylate in an amount ranging from 50 mg/m$^2$ to 500 mg/m$^2$, a finely divided inorganic powder, preferably silicium dioxide with a specific surface ranging from 100 to 500 m$^2$ per gr and a matting agent in an amount ranging from 0.1 mg/m$^2$ to 1 mg/m$^2$ with an average number diameter ranging from 1 to 7 $\mu$m. Said layer can further contain a surfactant, an antistatic polymer, etc.

In another elmbodiment said optical card is laminated on the side containing the adhesive layer to a layer package comprising in the order given a prelayer, an interlayer, a transparent support, preferably as mentioned above and preferably a protective layer.

Said prelayer, as also in the previous embodiment can be imaged with different printers such as a laser printer, a wax printer and an ink jet printer.

The surfaces of the protective layers and the prelayer when said layer is an outer layer of a layer package can receive security or verification marks in the form of e.g. finger prints, printed patterns known from bank notes, holograms, kinegrams, coded information, e.g. binary code information, signature or other printed personal data or marks that may be applied with liquid crystals, fluorescent pigments, nacreous pigments giving special light-reflection effects, and/or visibly legible or ultraviolet-legible printing inks as described e.g. in GB-P- 1 518 946 and U.S. Pat. No. 4,105,333. On said layers can be printed with a wax printer, a laser printer, an ink jet printer and all other kinds of printers. After imaging the diffusion image receiving layer or the prelayer the layer package or layer packages containing said layers are laminated to the optical card with the image receiving layer or the prelayer contiguous to the optical card.

While the present invention will hereinafter be described in connection with preferred embodiments thereof, it will be understood that it is not intended to limit the invention to those embodiments.

EXAMPLE I

As the optical recording medium was employed one obtained by coating a polymethine type dye with a thickness of 0.1 μm as the optical recording layer on a black acrylic resin substrate equipped with a pregroove of 85 mm×54 mm×0.4 mm, followed by lamination of a polyethylene layer of 30 μm. A layer package is prepared consisting in the order given of a physical nuclei containing image receiving layer, a prelayer, an interlayer, a subbed polyethylene terephthalate layer and a protective layer.

The layer package is prepared consisting in the order given of a silver diffusion image receiving layer, a prelayer, an adhesive layer, a subbed polyethylene terephthalate layer and a protective layer.

The silver diffusion image receiving layer was coated at a dry coverage of 1.77 g/m$^2$ with an image-receiving layer containing silver-nickel sulphide nuclei dispersed in gelatin.

The prelayer consist of 0.6 g/m$^2$ of a medium viscous Ca-containing gelatin K16096 of Koepff, 0.20 g/m$^2$ of a UV-filtering dye, 0.10 g/m$^2$ of an epoxysiloxane and 0.03 g/m$^2$ of an anionic surfactant The interlayer consist of 2.4 g/m$^2$ of LUPHEN D200A™, a polyurethane dispersion with a viscosity at 23° C. between 20 and 80 mPa.s at a shearing rate of 250s$^{-1}$ from Bayer, A. G. and 0.075 g/m$^2$ of an amidosiloxane cross-linking compound.

The subbed polyethylene terephthalate layer is 100 μm thick. transparent and oriented.

The protecting layer comprises 200 mg/m$^2$ polymethacrylate, 20 mg/m$^2$ silicium dioxide with a specific surface of 100 m$^2$ per gr, 0.3 mg/in$^2$ of a polymethacrylate matting agent with an average number diamete:r ranging of 3 μm. Said layer further contains 20 mg/m$^2$ of a surfactant, and 150 mg/m$^2$ of an antistatic polymer.

Preparation of the Imaging Material.

A paper support having a weigth of 110 g/m$^2$ being coated at both sides with a polyethylene layer and provided at one side with a pack of two backing layers was coated at the other side with an antihalation layer containing carbon black in such an amount that the optical density for visual light corresponded to 0.6 and gelatin in an amount of 3.9 g/m$^2$ and wherein also hydroquinone and 1-phenyl-4-methyl-pyrazolidin-3-one were present in a coverage of 0.57 glm$^2$ and 0.32 g/m$^2$. On said antihalation layer an orthochromatically sensitized negative working gelatino silver halide emulsion layer was coated containing an amount of silver chlorobromide (1.8 mol % bromide) equivalent to 2.0 g/m$^2$ of silver nitrate and an amount of gelatin of 2.66 g/m2. The average grain size of the silver chlorobromide was 0.3 μm. The silver halide emulsion layer was overcoated with a thin protective gelatin layer at a coverage of 0.5 g/m2.

The layer nearest to the support of the backing layer pack contained 4 g/m$^2$ of gelatin, 1.5 g/m$^2$ of a colloidal silica and 0.021 g/m$^2$ of wetting agent $F_{15}C_7$—COONH4. The second backing layer contained 0.3 g/m2 of gelatin, 0.5 g/m2 of the antistatic agent co(tetraallyloxyethane/methacrylate/acrylic acid-K-salt) polymer and 0.05 g/m2 of hardening agent triacrylformal

| Composition of the processing liquid: A1 | |
|---|---|
| Hydroxyethylcellulose (g) | 1 |
| EDTA (g) | 2 |
| Na2SO3 (anhydrous) (g) | 45 |
| Na2S2O3 (anhydrous) (g) | 14 |
| KBr (g) | 0.5 |
| 1-Phenyl-5-mercapto-tetrazole (g) | 0.08 |
| 1-(3,4 dichlorophenyl)-1-H-tetrazole-5-thiol (g) | 0.04 |
| DMEA (ml) | 30 |
| MDEA (ml) | 35 |
| Boric acid | 31 |
| Sodium hydroxide | 33.5 |
| Water up to | 1 liter |
| pH | 11.4 |

EDTA = ethylenediaminetetraacetic acid tetrasodium salt
DMEA = dimethylethanolamine
MDEA = methyldiethanolamine The photographic material was exposed through a sensitometric wedge in a contact exposure apparatus operating with a light source having a colour temperature of 3200° K. The exposed photographic material was pre-moistened with the processing liquid, the contact time with said liquid being 6 seconds before being pressed together with the image-receiving material as defined above. The transfer processor employed was a COPYPROOF (registered trade name of AGFA-GEVAERT N.V.) type CP 380. The transfer was carried out at a processing temperature of 22° C. at a transfer contact time being 60 seconds.

The layer package was laminated to the optical card in so a way that the image receiving layer of the layer package was laminated to the polyethylene layer of the optical card. A visually perfectly legible image was obtained.

What is claimed is:

1. An imaged element comprising art optical card and underneath a layer package comprising in the order given an optional image receiving layer, a prelayer, an interlayer and a transparent support, at least the optional image receiving layer or the prelayer comprising an image, characterized in that the interlayer contains a polyurethane and a cross-linking agent, wherein said polyurethane is a polyurethane polymer in the form of a dispersion of particles of polyurethane polymer with a viscosity at 23° C. between 20 and 80 mpa·s at a shearing rate of 250 s$^{-1}$.

2. An imaged element according to claim 1 wherein the polyurethane particles have a number average diameter ranging from 0.05 to 1 μm.

3. An imaged element according to claim 1 wherein said polyurethane is present in a range from 1 g/m$^2$ to 10 g/m$^2$.

4. An imaged element according to claim 1 wherein said interlayer contains a cross-linking compound in the range from 0.02 g/m$^2$ to 0.2 g/m$^2$.

5. An imaged element according to claim 1 wherein said interlayer contains a cross-linking compound selected from the group consisting of isocyanates and amidosiloxanes.

6. An imaged element according to claim 1 wherein said prelayer contains at least one gelatin species whereof a 10% by weight aqueous solution at 36° C. and pH 6 has a viscosity ranging from 15 to 30 mPa·s at a shearing rate of 1000 s$^{-1}$.

* * * * *